W. HAILES.
Tea Kettle.
No. 60,508. Patented Dec. 18, 1866.
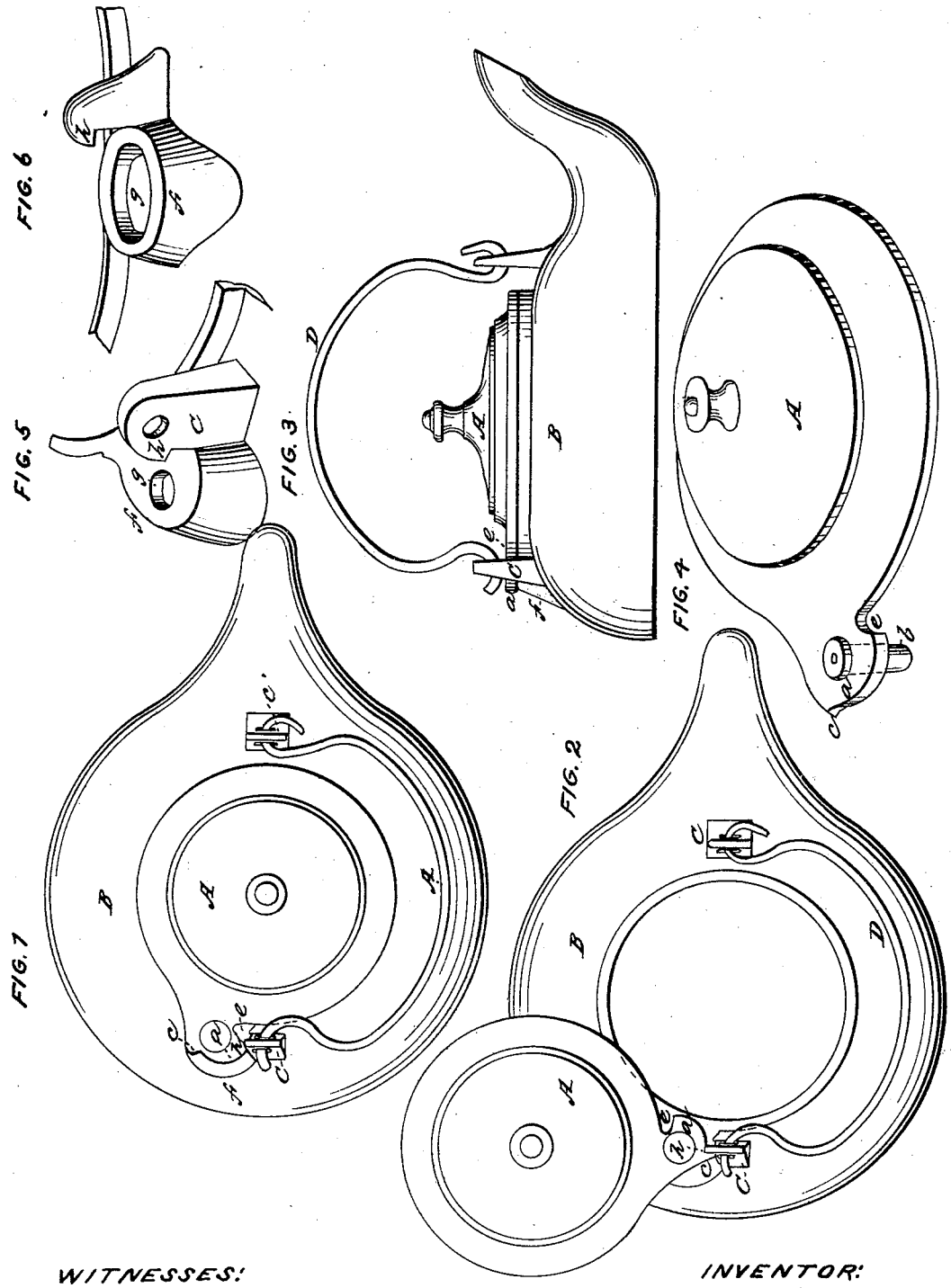

United States Patent Office.

MODE OF ATTACHING COVERS TO KETTLES, BOILERS, STOVES, &c.

WILLIAM HAILES, OF ALBANY, NEW YORK, ASSIGNOR TO HIMSELF AND S. H. RANSOM.

Letters Patent No. 60,508, dated December 18, 1866.

*The Schedule referred to in these Letters Patent and making part of the same.*

TO ALL WHOM IT MAY CONCERN:

Be it known that I, WILLIAM HAILES, of Albany, in the county of Albany, and State of New York, have invented a new and useful mode of Securing Covers to Kettles and other Vessels; and I do hereby declare that the following is a full, clear, and exact description thereof, reference being had to the accompanying drawings, making a part of this specification, in which—

Figure 1 is a top view of a tea-kettle, showing my improved mode of applying its cover.

Figure 2 is a similar view, showing the cover moved to one side of the opening in the kettle.

Figure 3 is a side elevation of the upper portion of the tea-kettle.

Figure 4 is a perspective view of the cover.

Figure 5 is a perspective view of the pivot-socket and hooked fastening.

Figure 6 is a perspective view of a socket and hooked fastening for the cover of a stove hole.

Similar letters of reference indicate corresponding parts in the several figures.

The object of my invention is to provide for pivoting covers to vessels or to stoves without employing screws, pins, or other separate or detached fastenings, as will be hereinafter described.

To enable others skilled in the art to understand my invention, I will describe its construction and operation.

In the accompanying drawings, I have represented my invention applied to a tea-kettle, but I do not desire to confine its use to this class of vessels, as it is applicable to all vessels having covers which can be swung horizontally. I form a projection, a, on the outer edge of the cover A, which projection has cast on it a pivot-piece, b, and also a stop, c. One portion of the projection a is curved concentric to the axis of its pin, b, and this curved edge terminates in a notch at e, shown in figs. 1, 2, and 4. On top of the kettle B, and near the hooked eye-piece C, an enlargement, f, is cast, the upper surface of which is in the plane of the top of the kettle, or that portion on which the cover rests when it is in place. Through this enlargement is a hole or socket, g, for receiving in it the pivot b on the cover A, and allowing this cover to be swung horizontally from the position shown in fig. 1 to that shown in fig. 2, in which latter position the stop or shoulder c, on the curved portion a, will be brought in contact with the eye-piece C, and prevent the cover from being moved further around. The eye-piece C, and the corresponding projection C', which is opposite to it, are intended for receiving the bail hooks, as shown in figs. 1 and 3. The piece C is constructed with a hook, h, overhanging the surface of the perforated enlargement f, and serving as a means for keeping the cover A down in place, except when this cover is adjusted in such a position as will bring the notch e beneath the hook, when the cover may be lifted from the kettle. When the bail D is applied to the kettle the hooked portion of it, which enters the eye-piece C, will prevent the cover from being detached from the kettle, in whatsoever position such cover may be adjusted; consequently it will be necessary to apply the cover to the kettle before the bail is hooked to its eyes. The notch e in projection a should be of such size as will allow the hooked edge of the eye-piece C to enter it in applying or removing the cover. When this notch is not directly beneath the hook the cover cannot be removed, as this hook, h, overhangs the edge of the portion a, as shown in figs. 1 and 2. The hooked eye-piece C, and the perforated enlargement, f, are cast on the kettle, and require no filing, except that of finishing the casting if it is rough. In fig. 6 I have represented a hook and socket fastening applied to the top of a stove, and adapted for fastening the cover of a stove hole, so that such covers may be hung horizontally. Instead of forming the socket in the enlargement f for receiving the stud b on the projection a of the cover, the stud b may be formed on said enlargement, and a hole made through the portion a for receiving it. I prefer, however, to form the stud on the cover as above described.

Having thus described my invention, what I claim as new, and desire to secure by Letters Patent, is—

1. Securing covers to vessels or other objects by a pivot connection, in such manner that the covers will be held down in place by an overhanging hook, C, or its equivalent, substantially as described.

2. The combination of the hook h, and the perforated portion f, with the projection a and its stud b, substantially as and for the purposes described.

3. The construction of the projection a with a stop c, and a notch e formed on it, substantially as and for the purposes described.

WILLIAM HAILES.

Witnesses:
JOSEPH M. NORTHROP,
THOS. ROBINSON.